US006865295B2

(12) United States Patent
Trajkovic

(10) Patent No.: US 6,865,295 B2
(45) Date of Patent: Mar. 8, 2005

(54) PALETTE-BASED HISTOGRAM MATCHING WITH RECURSIVE HISTOGRAM VECTOR GENERATION

(75) Inventor: Miroslav Trajkovic, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 598 days.

(21) Appl. No.: 09/854,121

(22) Filed: May 11, 2001

(65) Prior Publication Data

US 2002/0168106 A1 Nov. 14, 2002

(51) Int. Cl.[7] .............................................. G06K 9/00
(52) U.S. Cl. .................................... 382/170; 382/305
(58) Field of Search ................................ 382/170, 168, 382/165, 162, 305, 128, 209, 218, 219, 103, 108, 180, 190–192, 195, 142, 220, 107; 707/1–7, 104.1; 348/169, 699–700; 358/418–522; 345/700, 788, 419, 835, 584, 589, 597

(56) References Cited

U.S. PATENT DOCUMENTS

| 5,204,911 A | * | 4/1993 | Schwartz et al. ............ 382/142 |
| 5,537,488 A | * | 7/1996 | Menon et al. ............... 382/170 |
| 5,793,883 A | * | 8/1998 | Kim et al. ................... 382/128 |
| 6,181,817 B1 | * | 1/2001 | Zabih et al. ................. 382/170 |
| 6,411,730 B1 | * | 6/2002 | Bartell et al. ................ 382/168 |
| 6,647,141 B1 | * | 11/2003 | Li ............................... 382/162 |
| 6,671,402 B1 | * | 12/2003 | Pass et al. ................... 382/170 |
| 6,782,395 B2 | * | 8/2004 | Labelle ....................... 707/104.1 |
| 2002/0176001 A1 | * | 11/2002 | Trajkovic .................... 348/169 |

FOREIGN PATENT DOCUMENTS

| EP | 0463242 A1 | * | 1/1992 | ............ G06K/9/64 |
| EP | 0654 749 A2 | * | 5/1995 | ............ G06K/9/00 |
| EP | 1102 212 A2 | * | 5/2001 | ............. G06T/9/00 |

OTHER PUBLICATIONS

Swain et al. (Indexing via color histogram, IEEE ISN: 4111557, 390–393.*

Dimitrova et al., Color superhistogram for video representation, IEEE 0–7803–5467–2,/99, 314–318.*

Wong et al., Merged–color histogram for image retrieval, IEEE 0–7803–7622–6/02.*

* cited by examiner

*Primary Examiner*—Leo Boudreau
*Assistant Examiner*—Ishrat Sherali
(74) *Attorney, Agent, or Firm*—Michael E. Belk

(57) ABSTRACT

A histogram comparison process is provided that compares a histogram-vector of a first dataset to a corresponding histogram-vector of a second dataset. The histogram-vectors of the first and second datasets are formed from the histogram values of a select few of the histogram classes, the select few classes being the classes of the first dataset that contain the highest frequency count. The second dataset is characterized using only the select few classes of the first dataset; data items with values that belong to other classes are ignored. A palette dataset is created, corresponding to the second dataset, wherein the data items in the third dataset correspond to indexes to the select classes of the first dataset, or null indexes for the ignored data items. The histograms corresponding to overlapping regions is determined recursively, based on the third dataset. Given a histogram corresponding to a first region, the histogram of a second, overlapping, region is determined by merely incrementing the frequency count of the indexes of the elements that are in the second region, but not the first, and decrementing the frequency count of the indexes of the elements that are in the first region, but not the second.

20 Claims, 4 Drawing Sheets

SEARCH    100       101
ARRAY

| q | z | g | w | s | x | d | e | a | c | r | v | t | v | c | x | a | w | e | j | r | c | z | g |
|---|---|---|---|---|---|---|---|---|---|---|---|---|---|---|---|---|---|---|---|---|---|---|---|
| d | y | a | y | y | y | y | y | y | f | y | y | y | y | h | i | l | s | k | a | m | o | p |   |
| y | y | a | t | j | a | r | j | j | y | y | s | y | y | y | y | y | y | y | y | s | y | y |   |
| y | r | d | y | t | a | r | a | y | f | s | y | y | f | y | d | a | y | s | s | y | s | y |   |
| g | y | w | f | r | g | f | w | y | a | y | g | y | y | q | y | y | w | y | y | v | y | y |   |
| y | y | s | y | d | z | z | f | a | j | y | y | s | y | s | y | y | y | y | a | y | d | y | a |
| y | t | y | y | d | d | z | s | s | d | g | y | y | a | y | w | q | j | m | y | m | m | y | y |
| y | s | y | y | y | d | s | r | d | a | f | s | y | j | a | y | f | m | a | h | a | k | y | y |
| s | e | a | y | y | a | r | r | q | a | s | e | e | y | y | h | y | y | f | y | y | y | y | a |
| y | e | r | r | y | w | y | j | a | y | y | g | y | y | y | f | y | h | q | n | y | y | y | y |
| y | e | e | f | q | y | y | y | a | y | s | y | g | y | r | y | y | y | y | f | m | y | s | y |
| y | e | e | y | y | w | y | t | y | w | y | y | q | w | s | v | y | r | y | y | e | h | y | s |
| s | y | y | d | y | y | f | t | t | e | y | y | h | y | y | m | h | y | a | q | l | y | y | y |
| y | f | y | y | q | y | y | y | s | y | y | y | v | k | y | y | a | k | y | s | f | y | y | q |
| y | y | y | y | t | y | a | s | s | q | y | a | y | y | d | y | e | v | y | y | y | y | s | y |
| a | y | y | d | t | y | y | a | y | a | y | y | m | p | y | q | y | y | y | y | y | s | y | j |

FIG. 1

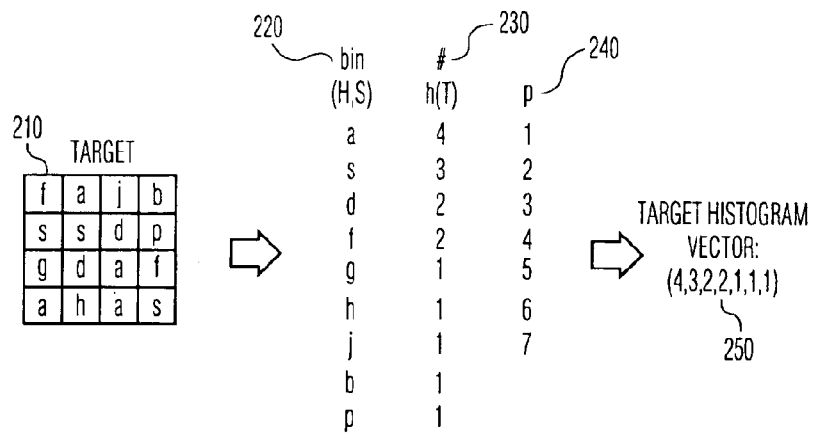

PALETTE-BASED HISTOGRAM MATCHING WITH RECURSIVE HISTOGRAM VECTOR GENERATION

BACKGROUND OF THE INVENTION

1. Field of the Invention

This invention relates to the field of image processing and pattern matching, and in particular to the comparison of two datasets based on a histogram characterization of each of the two datasets.

2. Description of Related Art

Histograms are commonly used to characterize sets of data. Similarities between sets of data can often be determined by comparing the relative frequency of occurrence of common values in each of the sets of data. Pattern matching, and in particular image matching, often includes histogram comparisons to determine similarities between images, or to search for target objects within larger images.

A histogram comprises 'classes', or 'bins', for containing a frequency count of the number of members of the class within the dataset being characterized. Each data item is associated with a class, based on its value, and the occurrence of each data value in the dataset causes the frequency count of the associated class to be incremented. In some histogram structures, each data item may be associated with multiple classes, and the frequency count of each class is incremented for each occurrence of the data item. For ease of reference herein, each data value is assumed to be associated with a single class, without loss of generality, because the principles of this invention are applicable regardless of the techniques used to assign frequency counts to classes.

The number of classes used to classify the different data values of a dataset generally determines the discriminating capability, or resolution, of the histogram. If many different data values are assigned to the same histogram class, the histograms of datasets having substantially different data values may be equivalent, and therefore indistinguishable. Conversely, if each different data value is assigned to a different histogram class, the histograms of datasets having very similar, but not exactly the same, data values will be substantially different, even though the datasets are similar. Generally, the number of classes used to classify the different data values is selected to provide a good distinguishing capability among substantially different datasets while also providing similar or equivalent histograms for substantially similar datasets.

In a conventional histogram comparison process, the time required to provide a measure of similarity between histograms is proportional to the number of classes in the histograms, and the time to compute the histogram of an area is proportional to the size of the area. A histogram structure that has good distinguishing capability (i.e. a large number of classes) may result in an excessively long processing time. In some applications, such as real-time video processing, the speed of processing is crucial to the feasibility of the application, and compromises that reduce the distinguishing capabilities of the histogram are often imposed.

A common application in the field of image processing is a search of a relatively large image for the location of a relatively small target image. In such an application, each region of the larger image that could possibly contain the smaller target image is assessed to determine whether the content of the region corresponds to the target content. In the context of this application, a histogram is created for the content of the target, and this target histogram is compared to a histogram corresponding to each of the possible target-containing regions in the larger image. Consider an image that is N by M pixels in size, and a target that is n by m pixels in size. The image comprises $(N-(n-1)) \times (M-(m-1))$ regions that could contain the target. In a typical application, an image may be 1024×1024 pixels in size, and a target may be less than 100×100 pixels in size. In this example, the image comprises almost a million possible regions, and a histogram is required for each of these regions. This potentially large number of regions to evaluate further necessitates an efficient histogram creation and histogram comparison process, particularly for real-time image processing.

BRIEF SUMMARY OF THE INVENTION

It is an object of this invention to provide a histogram comparison process that allows for sufficient distinguishing capabilities among histograms without requiring excessive processing time. It is a further object of this invention to provide a histogram comparison process having a processing time that is substantially independent of the number of classes in the histogram. It is a further object of this invention to provide a histogram comparison process that is independent of the size of a target. It is a further object of this invention to provide a histogram comparison process that is particularly efficient for assessing histograms corresponding to overlapping regions in a larger dataset.

These objects and others are achieved by providing a histogram comparison process that compares a histogram-vector of a first dataset to a corresponding histogram-vector of a second dataset. The histogram-vectors of the first and second dataset are formed from the histogram values of a select few of the histogram classes, the select few classes being the classes of the first dataset that contain the highest frequency count. The second dataset is characterized using only the select few classes of the first dataset; data items with values that belong to other classes are ignored. A palette dataset is created, corresponding to the second dataset, wherein the data items in the third dataset correspond to indexes to the select classes of the first dataset, or null indexes for the ignored data items. The histograms corresponding to overlapping regions is determined recursively, based on the third dataset. Given a histogram corresponding to a first region, the histogram of a second, overlapping, region is determined by merely incrementing the frequency count of the indexes of the elements that are in the second region, but not the first, and decrementing the frequency count of the indexes of the elements that are in the first region, but not the second.

BRIEF DESCRIPTION OF THE DRAWINGS

The invention is explained in further detail, and by way of example, with reference to the accompanying drawings wherein:

FIG. 1 illustrates an example array of values, corresponding to an example search array.

FIG. 2 illustrates an example target array of values, and the formation of a target histogram vector in accordance with this invention.

FIG. 4 illustrates an example palette array corresponding to occurrences of target palette values in the search array, in accordance with this invention.

Throughout the drawings, the same reference numerals indicate similar or corresponding features or functions.

DETAILED DESCRIPTION OF THE INVENTION

Figure 3:
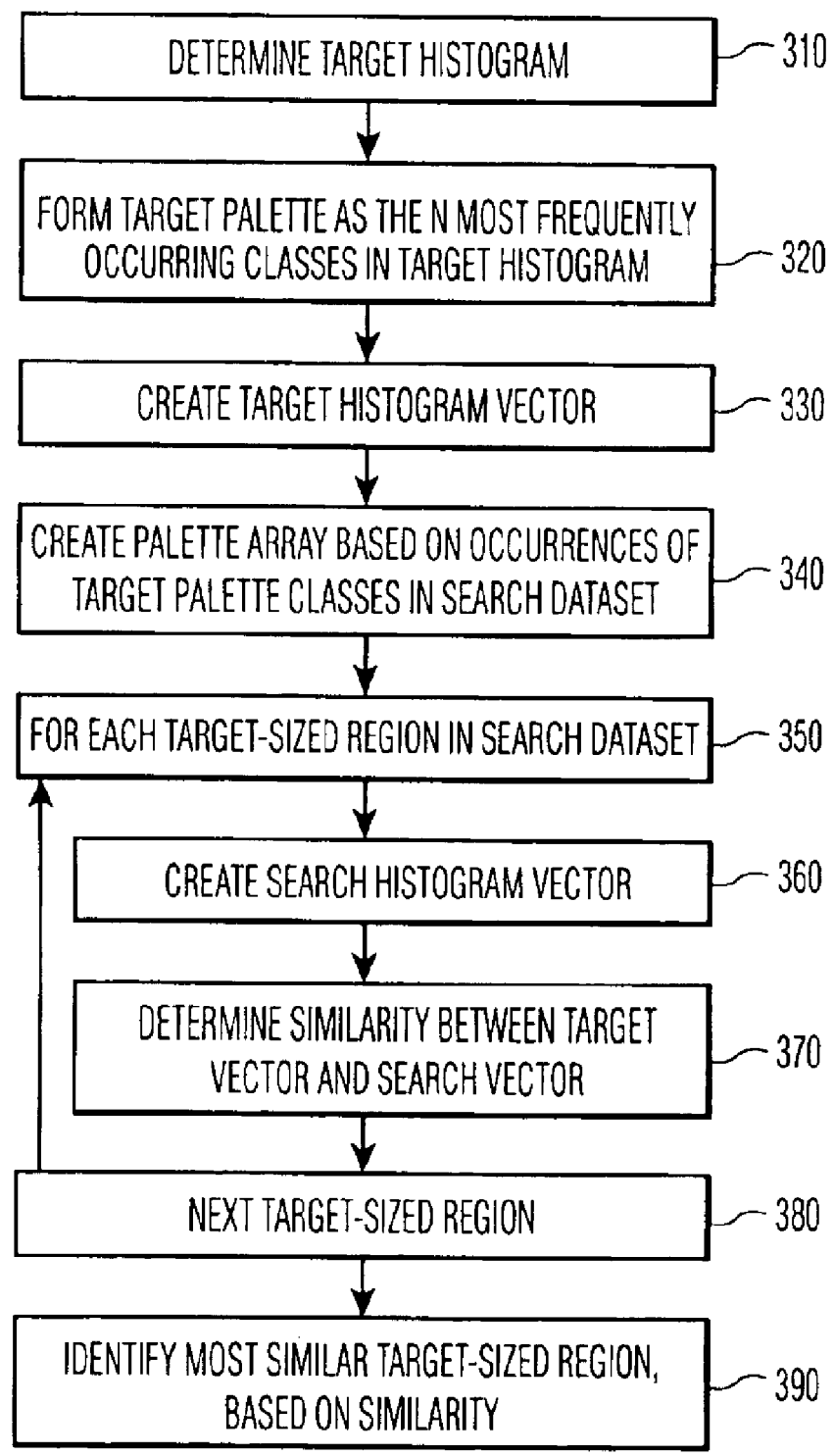
FIG. 3 illustrates an example flow diagram of an array comparison process in accordance with this invention.

This invention provides for a histogram-based comparison of two datasets, and is particularly well suited for locating a first dataset, or an approximation of the first dataset, within one or more regions of a larger dataset, or within one or more datasets within a larger collection of datasets. For ease of reference, the first dataset is termed a target dataset, or target. In the context of image processing, the target may be an image of a person. The histogram-based comparison process of this invention can be used to find the image of the person within a larger image of a group of people, or to find the image of the person among a collection of different images of people, or a combination of the two. Although this invention is presented using images as a paradigm dataset, it is applicable to the comparison of any sets of data based on the frequency of occurrences of classes of values (i.e. histograms), as would be evident to one of ordinary skill in the art in view of this disclosure.

FIG. 1 illustrates an example array of values 100, corresponding to a dataset that is to be compared to a target array of values (210 in FIG. 2). For ease of reference and illustration, the invention is presented in the context of finding a smaller target dataset within a larger search dataset, although, as noted above, the invention is applicable for finding a target dataset within a collection of other datasets, and each search dataset may be the same size as the target dataset. Although the search dataset is preferably at least as large as the target dataset, one of ordinary skill in the art will recognize that the comparison can be structured to find one or more smaller portions of the target in a smaller search dataset. Additionally, the datasets need not be two-dimensional arrays of values; single dimensional or multi-dimensional arrays are also comparable using the principles of this invention.

Each element 101 of the search array 100 is illustrated as having a data value within the range of a–z. In the context of image processing, these data values may correspond to a color value, a luminance value, a texture value, etc., or a combination of these values. For example, copending U.S. patent application "OBJECT TRACKING BASED ON COLOR DISTRIBUTION", Ser. No. 09/854,044, filed May 11, 2001 for Miroslav Trajkovic, and incorporated by reference herein, discloses the use of a composite data value is determined by a chromatic component if the data item (a pixel of an image) is distinguishable from gray, and a brightness component if the data item is gray, or near gray. Furthermore, the chromatic component is a combination of the measures of hue (color) and saturation (whiteness) of each data item. In other contexts, such as demographics, the data values may correspond to classifications of economics, political affiliation, and so on.

FIG. 2 illustrates an example target array of values 210, using the same set of possible data values (a–z) as the search array 100. That is, in the context of image processing, the letter 'a' in the target array 210 corresponds to the same color value, or composite value, as the data items in the search image too that also have the letter 'a', and vice versa. In general, the same process is used to determine the values of the data items in both the target and the search array.

In general, a target dataset will contain fewer different values than the number of possible data values. That is, for example, few, if any, images will contain all possible color values. In the example of FIG. 2, from the range of 26 possible values, or histogram bins, of a–z, the target contains nine different values: f, a, j, b, s, d, p, g, and h. The contents of histogram bins of each of these nine values 220 corresponding to the target image is illustrated at 230. As illustrated, the data value of 'a' occurs in the target four times; the value 's' occurs three times; the values 'd' and 'f' occur twice, and the values 'g', 'h', 'j', 'b', and 'p' each occur once. All other histogram bins in a histogram representation of the target will contain a frequency count of zero.

In accordance with this invention, the "N" most frequently occurring data values in the target are identified. In this example, N is chosen to be seven, and the seven most frequently occurring data values are identified as: a, s, d, f, g, h, and j. Tied values are selected arbitrarily for inclusion among the N values. That is, the letters g, h, j, b, and p each occur once; any three of these letters may be selected to complete the selection of seven data values.

Because this invention is particularly well suited for image processing and the matching of images based on histograms of color values, the collection of the N most frequently occurring data values in a target dataset is herein termed the target palette. In the example of FIG. 2, the target palette includes the values a, s, d, f, g, h, and j, with sequential indices 1–7 assigned to each, as indicated by the column 240. These indices 240 are used to form a vector 250, hereinafter termed the target histogram vector, or target vector, that indicates the number of each palette value in the target. That is, the first element, or dimension, of the vector corresponds to the palette value of 'a' (palette index '1'), and the value of the first element is four, thereby indicating that the target contains four occurrences of the value 'a'. In like manner, the second element indicates that the target contains three occurrences of the value 's' (palette index '2'), the third element indicates that the target contains two occurrences of the value 'd' (palette index '3), and so on. Note that, because the target palette and vector are limited to a size of N (7), some of the values (specifically b and p) that are contained in the histogram 230 corresponding to the target are not represented in the target palette, nor in the target vector. As will be presented hereinafter, the speed of comparing datasets using the principles of this invention is substantially dependent upon N, as is the ability to distinguish among similar datasets. The choice of N is dependent upon the particular application, and an appropriate tradeoff between speed and performance. In an image processing application, the value of N is typically seven or fifteen, for compatibility with common byte or word sizes of eight and sixteen bits.

Figure 4:
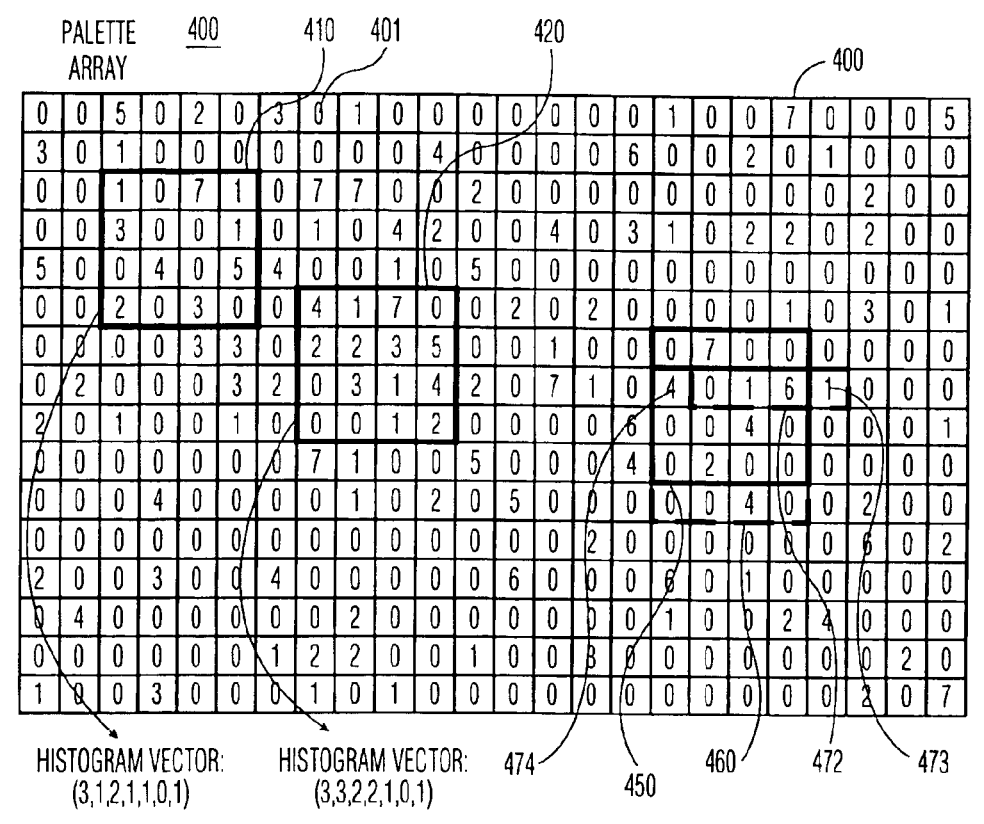

In accordance with this invention, the comparison of the target to another dataset, or subset of a dataset, is effected by comparing the target histogram vector with a histogram vector that corresponds to the other dataset, or subset. The comparison of the target histogram vector to a histogram vector of another dataset or subset is facilitated by the use of a "palette array" that corresponds to the occurrences of the target palette values in the search array. In the example of the search array 100, each element 101 of the array that contains one of the palette values of a, s, d, f, g, h, or j, is identified in the palette array by the palette index number, 1, 2, 3, 4, 5, 6, or 7, respectively. All other elements in the palette array are set to zero, or null, to indicate that a palette value is not contained at the corresponding element of the search array. FIG. 4 illustrates a palette array 400 that corresponds to the example search array 100 of FIG. 1, and is discussed further hereinafter.

FIG. 3 illustrates an example flow diagram of a dataset comparison process in accordance with this invention. At 310, the target histogram is determined by counting the number of occurrences of each data value in the target dataset. A mapping may be effected to map, or quantize, particular values into a data value corresponding to a class, or bin, of the defined histogram. For example, if the histogram classes correspond to a partitioning of a continuous range of values into integer values, a rounding or truncation process will be applied to identify an integer data value corresponding to the appropriate histogram class, or bin.

A target palette is formed, as presented above, by identifying the N most frequently occurring data values (histogram classes) within the target dataset, at 320. The target palette is used to form the target histogram vector, at 330, as presented above, and to create a palette array corresponding to the occurrences of target palette values in the search dataset, at 340.

FIG. 4 illustrates an example palette array 400 corresponding to occurrences of the example target palette values (a, s, d, f, g, h, and j) of FIG. 2 within the search array 100 of FIG. 1. The first five elements of the first row of the search array 100 of FIG. 1 are q, z, g, w, and s, and the first five elements of the first row of the palette array 400 of FIG. 4 are 0, 0, 5, 0, and 2, respectively. The first two letters, q and z, are not in the set of target palette values, and thus the palette array 400 contains a zero or null value in the corresponding first two locations of the first row. The third letter, g, is a member of the set of target palette values, and its palette index is five. Thus, the third element of the first row of the palette array 400 is the index value, five. In like manner, the fourth and fifth letters, w and s, map to palette array values of zero (w is not a palette value) and two (s is the second value in the target palette). Algorithmically, this process is defined as:

if $V_{ij}$ is a member of the palette values,
then $p_{ij}=m$,
else $p_{ij}=0$;

where $V_{ij}$ is the value of the data item at the i,j location of the search dataset (100 in FIG. 1), $P_{ij}$ is the value of the corresponding i,j entry in the palette array, and m is the index of the palette value corresponding to the search value $V_{ij}$.

A search for the target within the image is effected by processing the image palette 400. The image palette 400 is searched for a region of the same size as the target that has a similar histogram vector to the target histogram vector, via the loop 350–380 of FIG. 3. As would be evident to one of ordinary skill in the art, regions that differ in size from the target histogram vector may be used, provided the histograms are normalized for the differences in size. Equal target and region sizes are assumed hereinafter, for ease of reference.

Because the index to the palette values that are used to create the target histogram vector is associated with each element in the image palette 400, the creation of the histogram vector for the region of the search dataset merely requires an accumulation of the number of times each index appears in the region of the search dataset. A region 410 of FIG. 4, for example, which includes three occurrences of palette-index-1, one occurrence of palette-index-2, two occurrences of palette-index-3, and so on, has a histogram vector of (3,1,2,1,1,0,1) 415, In like manner, a region 420 has a histogram vector of (3,3,2,2,1,0,1) 425. The histogram vector for each target-sized region of the palette array is determined, at 360 in FIG. 3, and compared to the target histogram vector, at 370. Preferably, the following equation is used to determine the similarity between two histogram vectors:

$$S = \sum_{k=1}^{N} \min(hR_k, hT_k),$$

where hR is the histogram vector of the region, hT is the histogram vector of the target, and N is the length, or number of dimension, in each histogram vector. In the example, the similarity of vector 415 of FIG. 4 (3,1,2,1,1,0,1) to the target vector 250 of FIG. 2 (4,3,2,2,1,1,1) is:

$S$=min(3,4)+min(1,3)+min(2,2)+min(1,2)+min(1,1)+min(0,1)+ min(1,1)

$S$=3+1+2+1+1+0+1=9.

The similarity of vector 425 (3,3,2,2,1,0,1) to the target vector 250 (4,3,2,2,1,1,1) is:

$S$=min(3,4)+min(3,3)+min(2,2)+min(2,2)+min(1,1)+min(0,1)+ min(1,1)

$S$=3+3+2+2+1+0+1=12.

Based on these two similarity measures, region 420 (corresponding to vector 425) is determined to be more similar to the target than region 410. This similarity measure can be normalized to a 0–1 range, based on the maximum possible value, which is the sum of the components of the target histogram vector hT. In this example, the maximum value is 14, and thus the region 420 is determined to have a normalized similarity measure of $12/14$, or approximately 0.86, compared to a similarity measure of approximately 0.63 for region 410.

Note that a histogram vector must be determined for each different target-size region in the search set, or palette 400. In accordance with another aspect of this invention, each region's histogram vector is determined based on the histogram vector of its immediate neighbor. Consider, for example, vertically adjacent target-sized regions 450 and 460 in FIG. 4, region 460 being the region defined by the dashed outline. The histogram vector of region 450 is (1,1,0,2,0,1,1). The histogram vector of region 460 can be determined by decrementing the vector value of the index associated with the set of pixels in the first row of the region 450 (corresponding to the pixels that are in region 450 but not in region 460), and incrementing the vector value of the index associated with the set of pixels in the row below the region 450 (corresponding to the pixels in region 460 that are not in region 450). In this example, the vector value of the seventh palette color is decremented, and the vector value of the fourth palette color is incremented, giving a histogram vector of region 460 of (1,1,0,2+1,0,1,1−1)=(1,1, 0,3,0,1,0). In like manner, a histogram of a horizontally adjacent region to another region can be determined by decrementing the vector values of the indexes in the vertical column that is 'deleted' from the other region and incrementing the vector values of the indexes in the vertical column that is 'added' to the other region to form the horizontally adjacent region. Thus, after determining the first target-sized region's histogram vector, each subsequent histogram vector can be determined by a limited number of increment or decrement operations.

Figure 5A:
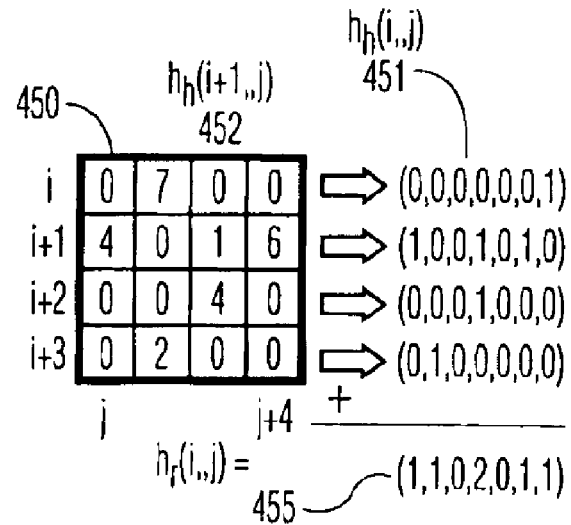
FIGS. 5A and 5B illustrate an example recursive determination of search histogram vectors for overlapping regions of the search array in accordance with this invention.
Figure 5B:
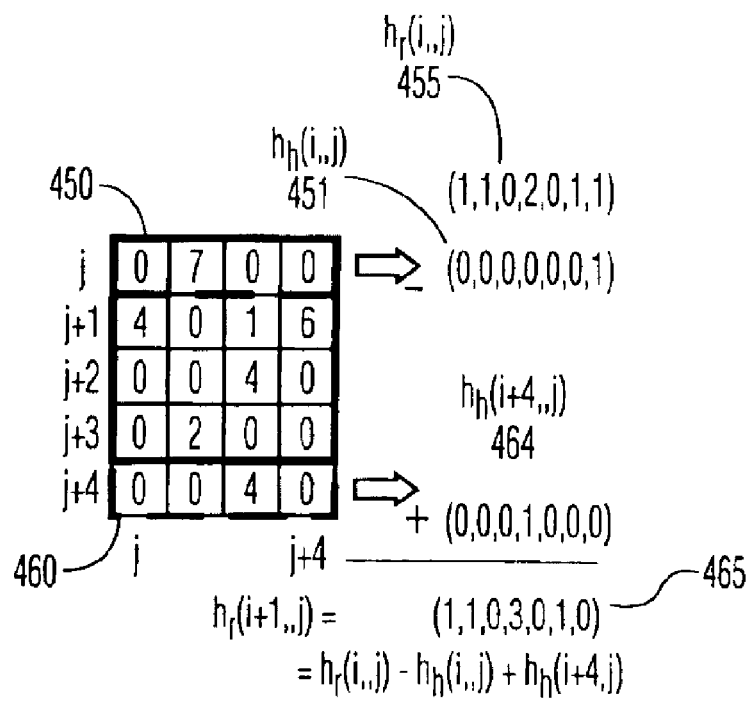

FIGS. 5A and 5B illustrate a further efficiency improvement for the recursive determination of search histogram vectors for overlapping regions of the search array in accordance with this invention. This embodiment is particularly well suited for systems that are configured to effect vector operations directly, such as systems that contain MMX technology.

The example target region 450 is shown in FIG. 5A; for ease of reference, indexes i,j are used to identify the row (i) and column (j) of each element. The index i,j at the upper left of the region is used to identify the region. Region 460 in FIG. 5B, for example, is identified as region (i+1,j), being in the same column (j) as region 450, but in the next lower row (i+1).

A histogram vector $h_h$ is illustrated corresponding to each row in the region 450. The vector $h_h(i,j)$ 451 corresponds to the target-sized row that begins at (i,j); $h_h(i+1,j)$ 452 as the row beneath it, and so on. The histogram vector 455 of region 450 is illustrated as the vector sum of each of the row vectors, and identified as $h_r(i,j)$.

Given that the histogram vector $h_r(i,j)$ exists, the histogram vector $h_r(i+1,j)$, corresponding to region 460, can be computed by merely subtracting the histogram vector corresponding to the uppermost row of the region, $h_h(i,j)$ 451, and adding the histogram vector corresponding to the row beneath the region 450, $h_r(i+4,j)$ 464, as illustrated in FIG. 5B. Algorithmically:

$$h_r(i+1,j) = h_r(i,j) + h_h(i+w,j) - h_h(i,j),$$

where w is the number of rows of the region. Note that a single vector addition and subtraction provides for a determination of a histogram vector corresponding to a region, independent of the vertical size, w, of the region. The speed of the vector addition and subtraction is dependent upon the number of dimensions in the vector, which, in this application is the number of palette values. The number of palette values determines the discriminating capabilities of the above described similarity measure, and thus, in accordance with this invention, the speed of the process is directly related to the discriminating capabilities of the histogram comparison process of this invention.

The above equation is applied to determine the histogram vector corresponding to each region in a vertical column (j). In a preferred embodiment of this invention, a recursive technique is also applied in the processing of adjacent vertical columns (j+1). As noted above, horizontal row vectors $h_h$ are used to compute a region histogram vector in a time that is substantially independent of the vertical size of the region. In like manner, each horizontal row vector $h_h$ is determined in a time that is substantially independent of the horizontal size of the region, as follows:

$$h_h(i,j+1) = h_h(i,j)$$

$$h_h(i,j+1)[p(i,j+m)]++$$

$$h_h(i,j+1)[p(i,j)]--,$$

where p(x,y) is the palette index value at the x,y location in the palette array, and m is the width of the region. The above equations are written in the "C" language, and correspond to setting the adjacent (i,j+1) histogram vector equal to the prior (i,j) histogram vector; incrementing the $p^{th}$ vector element in the histogram vector, where p is the content of the palette array element (i,j+m) that is immediately adjacent the last horizontal element of the row of the region (i,j); and decrementing the $p^{th}$ vector element in the histogram vector, where p is the content of the first palette array element (i,j) of the row of the region (i,j). In this manner, only a single increment and decrement operation is required to determine each row vector $h_h$, regardless of the horizontal size, m, of the region.

An example of this recursive determination of a row vector is illustrated with regard to the determination of the row vector for the elements (0-1-6-1) within the dashed outline 472 of FIG. 4, which is immediately adjacent to the second palette row (4-0-1-6) of region 450. The row vector 452 (1,0,0,1,0,1,0) corresponding to this second palette row (4-0-1-6) is illustrated in FIG. 5A. To determine the vector corresponding to row 472 from the row vector 452 of the prior adjacent row, the vector value is first set equal to the prior vector 452 (1,0,0,1,0,1,0). Then, the vector element corresponding to the palette value of the added palette element ("1") 473 is incremented (1+1,0,0,1,0,1,0), and the vector element corresponding to removed palette element ("4") 474 is decremented (1+1,0,0,1−1,0,1,0) to form a vector (2,0,0,0,0,1,0) corresponding to the desired element row (0-1-6-1) 472. Note that, because only the first and last-plus-one palette values of the prior row are required in this determination, this single increment and decrement process is applicable regardless of the width of the element row.

Similar equations can be derived for other structures than a two-dimensioned (i,j) array forming the target and search datasets, as would be evident to one of ordinary skill in the art in view of this disclosure. For example, a one-dimensioned (linear) array corresponds to a constant (unity) value of j, and the recursive determination of adjacent horizontal rows, described immediately above, can be used alone, thereby requiring a single increment and decrement operation to determine each histogram vector.

Preferably, this invention is embodied as a computer program that is executable on a processing system, with ancillary hardware elements, such as image and vector processors being controlled by the processing system. Other embodiments will be evident to one of ordinary skill in the art. For example, the palette array 400 may be created in a memory by a software routine that also determines the target vector and a first region vector. An "application-specific" integrated circuit, such as a programmable gate array, can be provided that is configured to 'step-through' the memory, comparing the target vector to the region vector, and applying the recursive algorithms defined above to determine each subsequent region vector, and repeating the process until each of the regions have been evaluated.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

I claim:

1. A method of identifying a target within datasets comprising:

determining a first histogram representing the target corresponding to a distribution of values in a first dataset, determining a plurality of palette values corresponding to a specified number of different values in the first dataset, determining a first histogram vector corresponding to the first histogram, the first histogram vector comprising elements that each correspond to a palette value of the plurality of palette values, identifying values in a second dataset corresponding to a plurality of palette values, determining a second histogram vector corresponding to the values in the second dataset, and comparing the first histogram vector to the second histogram vector to determine if the second histogram is representative of the target.

2. The method of claim 1, wherein:

determining the second histogram vector includes a recursive determination of the second histogram vector based on a prior determined histogram vector and elements that are contained in the prior determined histogram vector but not the second histogram vector, and elements that are contained in the second histogram vector but not the prior determined histogram vector.

3. The method of claim 2, wherein:

the recursive determination includes:

determining one or more row vectors, based on corresponding one or more prior row vectors, and determining the second histogram vector, based on the prior determined histogram vector and the one or more row vectors.

4. The method of claim 1, wherein the first dataset corresponds to first pixel values of a target image and the second dataset corresponds to second pixel values of a region of a source image.

5. The method of claim 4, wherein the first pixel values and the second pixel values correspond to at least one of a hue component, a saturation component, and a brightness component of each pixel.

6. The method of claim 1, wherein the plurality of palette values corresponds to the values in the first dataset having a higher frequency count in the first histogram than other values in the first dataset.

7. The method of claim 1, wherein the specified number of different values is substantially less than a maximum number of possible different values in the first dataset.

8. The method of claim 1, further including:

mapping values in the first and second datasets to a plurality of histogram classes, and wherein:

each palette value corresponds to a histogram class of the plurality of histogram classes.

9. The method of claim 1, wherein:

identifying values in the second dataset includes:

creating a palette dataset corresponding to the second dataset that identifies each occurrence of a palette value of the plurality of palette values, and determining the second histogram vector includes:

providing a count of a number of occurrences of each palette value in the palette dataset.

10. The method of claim 1, wherein:

the second dataset is a subset of a larger dataset that includes a third dataset that overlaps the second dataset, the third dataset having a third histogram vector, and determining the second histogram vector includes:

equating the second histogram vector to the third histogram vector;

determining the second histogram vector for palette values that are included in the third dataset but not the second dataset, and incrementing the second histogram vector for palette values that are included in the second dataset but not the third dataset.

11. The method of claim 10, wherein:

a first intermediate vector is determined for one or more segments of the third dataset that are not included in the second dataset, a second intermediate vector is determined for one or more segments of the second dataset that are not included in the third dataset, and decrementing the second histogram vector includes subtracting the first intermediate vector, and incrementing the second histogram vector includes adding the second intermediate vector.

12. The method of claim 1, further including:

identifying values in each of a plurality of datasets corresponding to the plurality of palette values, determining a plurality of other histogram vectors corresponding to the values in the plurality of datasets, comparing the first histogram vector to each of the plurality of histogram vectors, and identifying a select one of the plurality of datasets that is most similar to the first dataset, based on the comparing of the first histogram vector to the second histogram vector and each of the plurality of histogram vectors.

13. A computer implemented method to identify a target within datasets comprising:

create a first histogram corresponding to a distribution of values in a first dataset, wherein the first histogram is representative of the target, determine a plurality of palette values corresponding to a specified number of different values in the first dataset, determine a first histogram vector corresponding to the first histogram, the first histogram vector comprising elements that each correspond to a palette value of the plurality of palette values, identify values in a second dataset corresponding to a plurality of palette values, determine a second histogram vector corresponding to the values in the second dataset, and compare the first histrogram vector to the second histogram vector to determine if the second histogram sufficiently matches the target.

14. The computer implemented method of claim 13, to identify a select dataset of a plurality of datasets, including the second dataset, based on a similarity of the target to each of a plurality of datasets, by the following steps:

identify values in each of the plurality of datasets corresponding to the plurality of palette values;

determine a plurality of histogram vectors, each histogram vector corresponding to the values in each of the plurality datasets, compare the first histogram vector to each histogram vector to determine a comparative measure associated with each histogram vector, and identify the select database based on the comparative measure associated with each histogram vector.

15. The computer implemented method of claim 14, wherein:

the first dataset corresponds to first pixel values of a target image and each of the plurality of datasets corresponds to pixel values of each dataset.

16. The computer implemented method of claim 15, wherein:

the first pixel values and the second pixel values correspond to at least one of a hue component, a saturation component, and brightness component of each pixel.

17. An image processing system comprising:

a processor that is configured to;

create a first histogram representative of a target corresponding to a distribution of values in a first dataset, determine a plurality of palette values corresponding to a specified number of different values in the first dataset, determine a first histogram vector corresponding to the first histogram, the first histogram vector comprising elements that each correspond to a palette value of the plurality of palette values, identify values in a second dataset corresponding to a plurality of palette values, determine a second histogram vector corresponding to the values in the second dataset, and compare the first histogram vector to the second histogram vector to identify match to the target; and a memory, operably coupled to the processor, that is configured to store a representation of the values in the second dataset corresponding to the plurality of palette values, to facilitate determining the second histogram vector.

18. The image processing system of claim 17, further including:

an application-specific device that is configured to determine the second histogram vector based on the representation of the values that is stored in the memory.

19. The image processing system of claim 17, wherein:

the first dataset corresponds to first pixel values of a target image and each of the plurality of datasets corresponds to pixel values of each dataset.

20. The image processing system of claim 18, wherein:

the first pixel values and the second pixel values correspond to at least one of a hue component, a saturation component, and a brightness component of each pixel.

* * * * *